United States Patent [19]

McGuinness

[11] Patent Number: 5,316,362
[45] Date of Patent: May 31, 1994

[54] VEHICLES VISOR POSITION RETAINER

[76] Inventor: Morgan McGuinness, 9620 Sepulveda Blvd., #49, North Hills, Calif. 91343

[21] Appl. No.: 986,325

[22] Filed: Dec. 7, 1992

[51] Int. Cl.⁵ .................................................. B60J 3/02
[52] U.S. Cl. ................................. 296/97.9; 296/97.12
[58] Field of Search .................... 296/97.9, 97.1, 97.6, 296/97.8, 97.12; 160/370.2, DIG. 3

[56] References Cited

U.S. PATENT DOCUMENTS

| | | | |
|---|---|---|---|
| 4,913,483 | 4/1990 | Jasso | 296/97.8 |
| 5,098,149 | 3/1992 | Lee | 296/97.6 |
| 5,190,339 | 3/1993 | Ceideberg | 296/97.9 |

Primary Examiner—Robert R. Song
Attorney, Agent, or Firm—John J. Posta, Jr.

[57] ABSTRACT

The vehicle sun visor position retainer is preferably a unitary, flexible, resilient, generally flat piece of plastic, wood, metal, rubber, ceramic or cermet having first and second horizontally extending members. The second member extends laterally of the first member adjacent one end of the first member. The two members are integrally connected together by a step portion which holds the second member below but generally parallel to the first member. The first member contains a generally central vertical hole therethrough adapted to receive the vertical rod portion of a vehicle sun visor bracket. The first member also defines a slot from the periphery of the first member to the hole. Preferably, the slot has outwardly diverging sides. Also preferably, a pair of detents narrow the slot adjacent the hole to hold the first member in place around the rod. Cutaway portions on opposite sides of the detents may increase the effective flexibility. The retainer is horizontally rotatable around the rod between an operative position wherein the second member supports the visor from the underside thereof into an up position out of the way of the vehicle window next to which the visor is installed, and a storage so that the visor can be lowered to shield the eyes from the sun.

12 Claims, 1 Drawing Sheet

VEHICLES VISOR POSITION RETAINER

BACKGROUND OF THE INVENTION

1. Field of the Invention

The present invention generally relates to vehicle accessories and more particularly to an improved vehicle visor position retainer.

2. Prior Art

Vehicle windshield visors are normally held in place above the windshield on the interior of the car by a bracket which includes a horizontal arm running through the lower end of the visors and around which the visor can be pivoted between a down, sun-protecting position in front of the windshield and an up-stored position above the windshield. The other parts of the bracket are a vertical arm connected to one end of the horizontal arm, and to an anchor plate adapted to be secured to the vehicle interior at one side of and above the windshield.

Unfortunately, when the visor is heavily loaded with garage door openers, gate openers and sunglass cases, and especially as the visor gets older, it tends to pivot down on its own to the operative position, blocking a view through the windshield. This can be hazardous, especially when it occurs unexpectedly while driving the vehicle. So far as is known to applicant this problem has not been addressed before. It is a problem which needs to be solved. The solution to the problem should be some device which is simple in construction, inexpensive, durable and easy to use. It should provide a positive lock against inadvertant pivoting of the visor, as described above.

SUMMARY OF THE INVENTION

The improved vehicle sun visor position retainer satisfies all the foregoing needs. The retainer is substantially as set forth in the Abstract of the Disclosure. The retainer is preferably of unitary construction and is resilient and flexible. It is generally flat and of plastic, metal, wood, rubber, ceramic or cermet. It includes first and second generally horizontally extending members, with the second member extending laterally of the first member adjacent one end of the first member.

The two members are preferably integrally connected together by a step portion which holds the second member but generally parallel to the first member. The first member includes a generally central vertical hole or opening up therethrough adapted to receive the vertical rod portion of a vehicle sun visor bracket. The first member also has a slot from its outer periphery to the hole. The slot has preferably outwardly divergin sides and allow the first member to be slipped around the bracket rod and seat the rod in the hole. Preferably, a pair of flexible detents narrow the slot next to the hole to help hold the first member in place around the rod. Cut-away portions in the firt member adjacent the detents can be used to increase their effective flexibility.

When the retainer is in position around the bracket rod, the retainer can be horizontally rotated between an operative position wherein the upper surface of the second member positively lock supports the visor from underneath in the visor's stored position above the vehicle windshield, and a retainer-stored position wherein the retainer is away from the visor, permitting the visor to be lowered in front of the windshield to the eyeshielding position.

Thus, the retainer is simple, durable, inexpensive and easy to use and provides a positive locking effect for the visor. Further features of the invention are set forth in the following detailed description and accompanying drawings.

DRAWINGS

DETAILED DESCRIPTION

FIGS. 1 & 2

Figure 1:
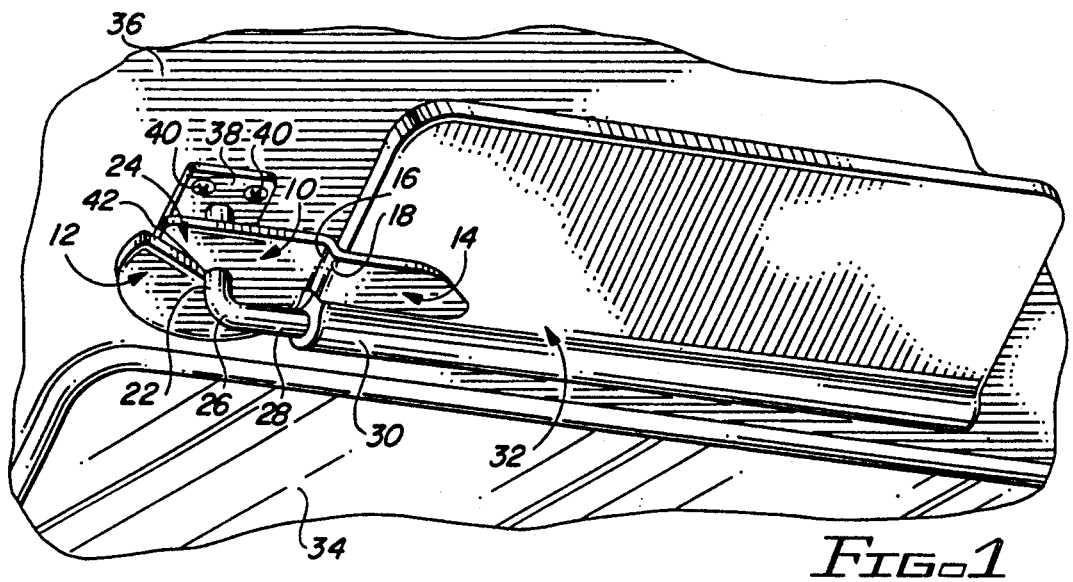
FIG. 1 is a schematic bottom perspective view of a first preferred embodiment of the improved vehicle windshield visor position retainer of the present invention, showing the retainer in place on the vertical rod of a windshield visor bracket, and supporting the visor against downward rotation.
Figure 2:
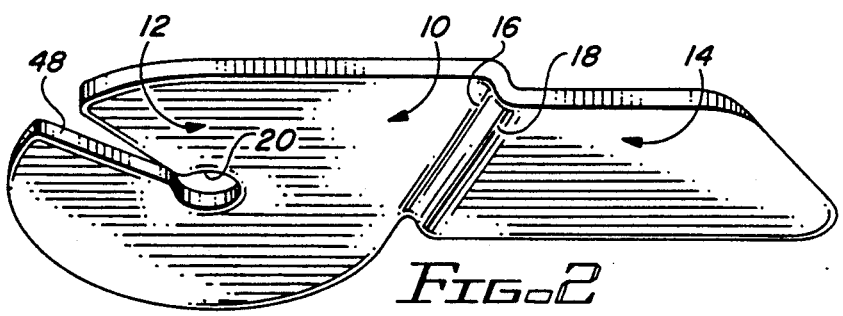
FIG. 2 is a schematic bottom perspective view of the retainer of FIG. 1.
Figure 4:
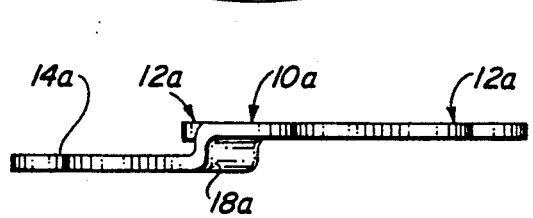
FIG. 4 is a schematic side elevation of the retainer of FIG. 3.
Figure 3:
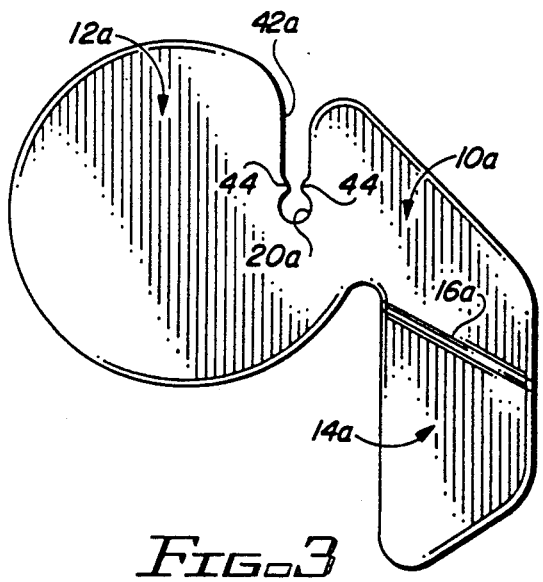
FIG. 3 is a schematic top plan view of a second preferred embodiment of the improved vehicle windshield visor position retainer of the present invention.

Now referring more particularly to FIGS. 1 and 2 of the drawings, a first preferred embodiment of the improved vehicle windshield visor position retainer of the present invention is schematically depicted therein.

Thus, retainer 10 is disclosed, which can be formed of plastic, wood, metal or rubber and is flexible and resilient. Retainer 10 is generally flat and elongated and is used in a generally horizontally extending mode, as shown in FIG. 1. Retainer 10 includes a first member 12, a second member 14 which extends laterally outwardly from one end 16 of member 12, and a step portion 18 which integrally interconnects members 12 and 14 together so that member 14 is horizontal and below member 12, with portion 18 being generally vertical.

Member 12 has a generally central vertical hole or opening 20 up therethrough, which hole 20 is adapted to receive vertical rod 22 which forms part of visor bracket 24. Rod 22 is connected at its lower end 26 to one end of a horizontal rod 28 which extends laterally through the lower end 30 of visor 32 so that visor 32 can rotate therearound, some friction, between the operative down position in front of windshield 34 of vehicle 36 and the stored up position shown in FIG. 1 wherein visor 32 is above windshield 34. Bracket 24 also includes a connector plate 38 releasably secured to the interior of vehicle 36 laterial of windshield 34, as by a pair of screws 40.

Member 12 has a vertical slot 42 extending between the outer periphery of member 12 and hole 20 to permit member 12 to be slipped horizontally around vertical rod 22 so as to seat rod 22 in hole 20, as shown in FIG. 1. Thus, once installed around rod 22, member 12 and connected member 14 can be rotated between the operative position shown in FIG. 1 wherein member 14 positively supports visor 32 against rotation down into its operative position, and the retainer stored position wherein retainer 10 is rotated away from visor 32, thus permitting visor 32 to be rotated down into the sunshielding position in front of windshield 34.

When retainer 10 is in the operative position of FIG. 1, it positively blocks and locks visor 32 against rotation to the sun-shielding position, thus effectively protecting the vehicle driver. Retainer 10 is light weight, inexpensive, durable, simple in construction and use, easy to install and highly effective.

FIGS. 3 & 4

Now referring more particularly to a second preferred embodiment of the improved windshield visor retainer of the present invention, retainer 10a is shown. Components thereof similar to those of retainer 10 bear the same numerals but are succeeded by the letter "a".

Retainer 10a is substantially identical to retainer 10, except as follows:

a) members 12a and 14a are of somewhat different size and shape than members 12 and 14; and, b) slot 42 diverges outwardly and narrows adjacent to hole 20a because of two flexible, resilient detents 44 facing each other and adapted to hold member 12a in place around rod 22a.

FIG. 5

Figure 5:
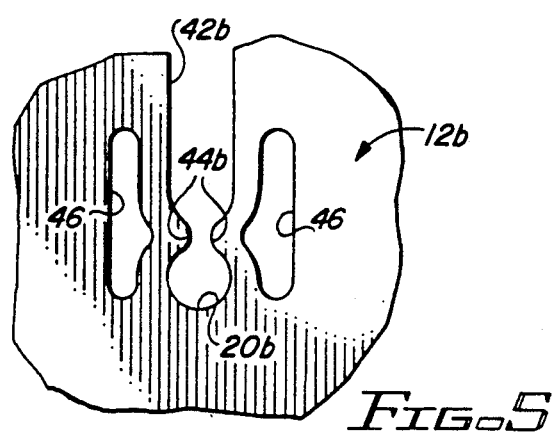
FIG. 5 is a schematic enlarged fragmentary top plan view of the hole, slot and cut-away portion of a third preferred embodiment of the improved vehicle windshield visor position retainer of the present invention.

Now referring more particularly to FIG. 5, a third preferred embodiment of the improved retainer of the present invention is schematically depicted therein. Thus, retainer 10b is shown. Components thereof similar to those of retainer 10 or retainer 10a bear the same numerals but are succeeded by the letter "b".

Retainer 10b is substantially identical to retainer 10a, except that cut-away portions 46 flank both detents 44b, in order to increase their effective flexibility. Retainer 10b as well as retainer 10a have all the advantages of retainer 10.

Various other modifications, changes, alterations and can be made in the improved vehicle windshield visor retainer and in the components thereof and their parameters. All such modifications, changes, alterations and additions as are within the scope of the appended claims form part of the present invention.

What is claimed is:

1. An improved vehicle sun visor position retainer, said retainer comprising a unitary flexible, resilient material, said retainer having
    a) a first approximately horizontal member having first and second opposite ends,
    b) a second approximately horizontal member having first and second opposite ends; and,
    c) a step portion interconnecting said second opposite end of said first member to said first opposite end of said second member, whereby said second member extends laterally of said first member in a plane below but generally parallel to said first member, said first member having a generally central vertical opening therein adapted to receive the vertical rod of a vehicle sun visor bracket, and a slot extending from the outer periphery of said first member to said opening for sliding said first member around said rod, said retainer being rotatable around said rod between an operative position in which the underside of said sun visor is supported by said second member in an up position, and a storage position in which said second member is rotated away from sun visor so that sun visor can be lowered for protection against the sun.

2. The improved retainer of claim 1 wherein said slot is narrowed adjacent said opening by a pair of flexible resilient detents which help hold said retainer in place on said rod.

3. The improved retainer of claim 2 wherein the area on opposite sides of said opening and adjacent said detents has cut-away portions which increase the flexibility of said detents.

4. The improved retainer of claim 1 wherein said retainer comprises a single generally flat plate of material selected from the group consisting of plastic, rubber, metal, ceramic, wood and cermet.

5. The improved retainer of claim 1 wherein said slot increases in width towards the outer periphery of said first member in order to facilitate slipping said first member around said rod.

6. An improved sun visor position retainer for maintaining a sun visor in a relatively fixed, predetermined position, said sun visor having attachment means including a vertical rod for connecting the visor to a vehicle, said retainer comprising a first retaining member for holding said visor in a fixed position and a base member secured to said retaining member having attachment means for removably securing said base member to said vertical rod.

7. The improved position retainer of claim 6 wherein said base member includes releasable retention means enabling ready removal of said retainer from contact with said visor.

8. The improved retainer of claim 6, wherein:
    a) said base member includes a first approximately horizontal member having first and second ends,
    b) said first retaining member includes a second approximately horizontal member having first and second ends; and,
    c) a step portion interconnecting said second opposite end of said approximately horizontal member to said first opposite end of said second member, whereby said second member extends laterally of said approximately horizontal member in a plane below but generally parallel to said approximately horizontal member, said approximately horizontal member having a generally central vertical opening therein adapted to receive the vertical rod of vehicle sun visor bracket, and a slot extending from the outer periphery of said approximately horizontal member to said opening for sliding said approximately horizontal member around said rod, said retainer being rotatable around said rod between an operative position in which the underside of said sun visor is supported by said second member in an up position, and a storage position in which said second member is rotated away from sun visor so that sun visor can be lowered for protection against the sun.

9. The improved retainer of claim 9 wherein said slot is narrowed adjacent said opening by a pair of flexible resilient detents which help hold said retainer in place on said rod.

10. The improved retainer of claim 8 wherein the area on opposite sides of said opening and adjacent said detents has cut-away portions which increase the flexibility of said detents.

11. The improved retainer of claim 8 wherein said retainer comprises a single generally flat plate of material selected from the group consisting of plastic, rubber, metal, ceramic, wood and cermet.

12. The improved retainer of claim 8 wherein said slot increases in width towards the outer periphery of said first member in order to facilitate slipping said first member around said rod.

* * * * *